United States Patent
Yoon et al.

(10) Patent No.: US 11,242,285 B2
(45) Date of Patent: Feb. 8, 2022

(54) METHOD OF MANUFACTURING CURVED JOINED GLASS SHEET AND CURVED JOINED GLASS SHEET MANUFACTURED BY THE SAME

(71) Applicant: LG CHEM, LTD., Seoul (KR)

(72) Inventors: Jae Hyuk Yoon, Daejeon (KR); Jun Hak Oh, Daejeon (KR); Ho Seong Kang, Daejeon (KR); Chang Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/954,675

(22) PCT Filed: May 20, 2019

(86) PCT No.: PCT/KR2019/005973
§ 371 (c)(1),
(2) Date: Jun. 17, 2020

(87) PCT Pub. No.: WO2019/225918
PCT Pub. Date: Nov. 28, 2019

(65) Prior Publication Data
US 2020/0339472 A1   Oct. 29, 2020

(30) Foreign Application Priority Data

May 21, 2018 (KR) .................. 10-2018-0057867

(51) Int. Cl.
| | |
|---|---|
| C03C 27/10 | (2006.01) |
| C03B 23/03 | (2006.01) |
| B32B 7/12 | (2006.01) |
| B32B 17/10 | (2006.01) |
| B32B 27/30 | (2006.01) |
| B32B 37/12 | (2006.01) |
| B32B 37/18 | (2006.01) |

(52) U.S. Cl.
CPC ............... *C03C 27/10* (2013.01); *B32B 7/12* (2013.01); *B32B 17/10036* (2013.01);
(Continued)

(58) Field of Classification Search
CPC ........... C03C 27/10; C03B 23/03; B32B 7/12; B32B 17/10036; B32B 17/10761;
(Continued)

(56) References Cited

U.S. PATENT DOCUMENTS 6,086,983 A * 7/2000 Yoshizawa ........ B32B 17/10036
428/215
2012/0280368 A1   11/2012 Garner et al.
(Continued)

FOREIGN PATENT DOCUMENTS

EP        0895853 A2    2/1999
EP        3138689 A1    3/2017
(Continued)

*Primary Examiner* — Tahseen Khan
(74) *Attorney, Agent, or Firm* — Dentons US LLP

(57) ABSTRACT

The present disclosure relates to a method of manufacturing a curved joined glass sheet having excellent optical quality by adjusting a radius of curvature of a curved thick glass sheet and a radius of curvature of a curved thin glass sheet. The method includes preparing a curved thick glass sheet having a first radius of curvature, manufacturing a curved thin glass sheet having a second radius of curvature by heating and molding a flat plate thin glass sheet, providing a joining film or an adhesive agent between a concave surface of the curved thick glass sheet and a convex surface of the curved thin glass sheet, and elastically deforming the curved thin glass sheet to join the elastically deformed curved thin glass sheet so as to match with the concave surface of the curved thick glass sheet.

9 Claims, 2 Drawing Sheets

(52) U.S. Cl.
CPC .. *B32B 17/10761* (2013.01); *B32B 17/10935* (2013.01); *B32B 27/30* (2013.01); *B32B 37/12* (2013.01); *B32B 37/182* (2013.01); *C03B 23/03* (2013.01); *B32B 2250/03* (2013.01); *B32B 2250/40* (2013.01); *B32B 2315/08* (2013.01); *B32B 2333/00* (2013.01); *B32B 2605/006* (2013.01); *B32B 2605/08* (2013.01)

(58) Field of Classification Search
CPC ... B32B 17/10935; B32B 27/30; B32B 37/12; B32B 37/182
USPC .......................................................... 428/174
See application file for complete search history.

(56) References Cited

U.S. PATENT DOCUMENTS

2014/0141206 A1    5/2014   Gillard et al.
2015/0224855 A1    8/2015   Legrand

FOREIGN PATENT DOCUMENTS

| | | |
|---|---|---|
| EP | 3395777 A1 | 10/2018 |
| EP | 3560899 A1 | 10/2019 |
| JP | H03-059337 U | 6/1991 |
| JP | 11060293 A | 3/1999 |
| JP | 2009035438 A | 2/2009 |
| JP | 2011207645 A | 10/2011 |
| JP | 2017048075 A | 3/2017 |
| JP | 2017190271 A | 10/2017 |
| KR | 10-20140008848 A | 1/2014 |
| KR | 10-20150071908 A | 6/2015 |
| WO | 2013051717 A1 | 4/2013 |
| WO | 2013-107706 A1 | 7/2013 |
| WO | 2014-029605 A1 | 2/2014 |
| WO | 2016-196531 A1 | 12/2016 |
| WO | 2017-023673 A1 | 2/2017 |
| WO | 2017-110560 A1 | 6/2017 |
| WO | 2017-179382 A1 | 10/2017 |

\* cited by examiner

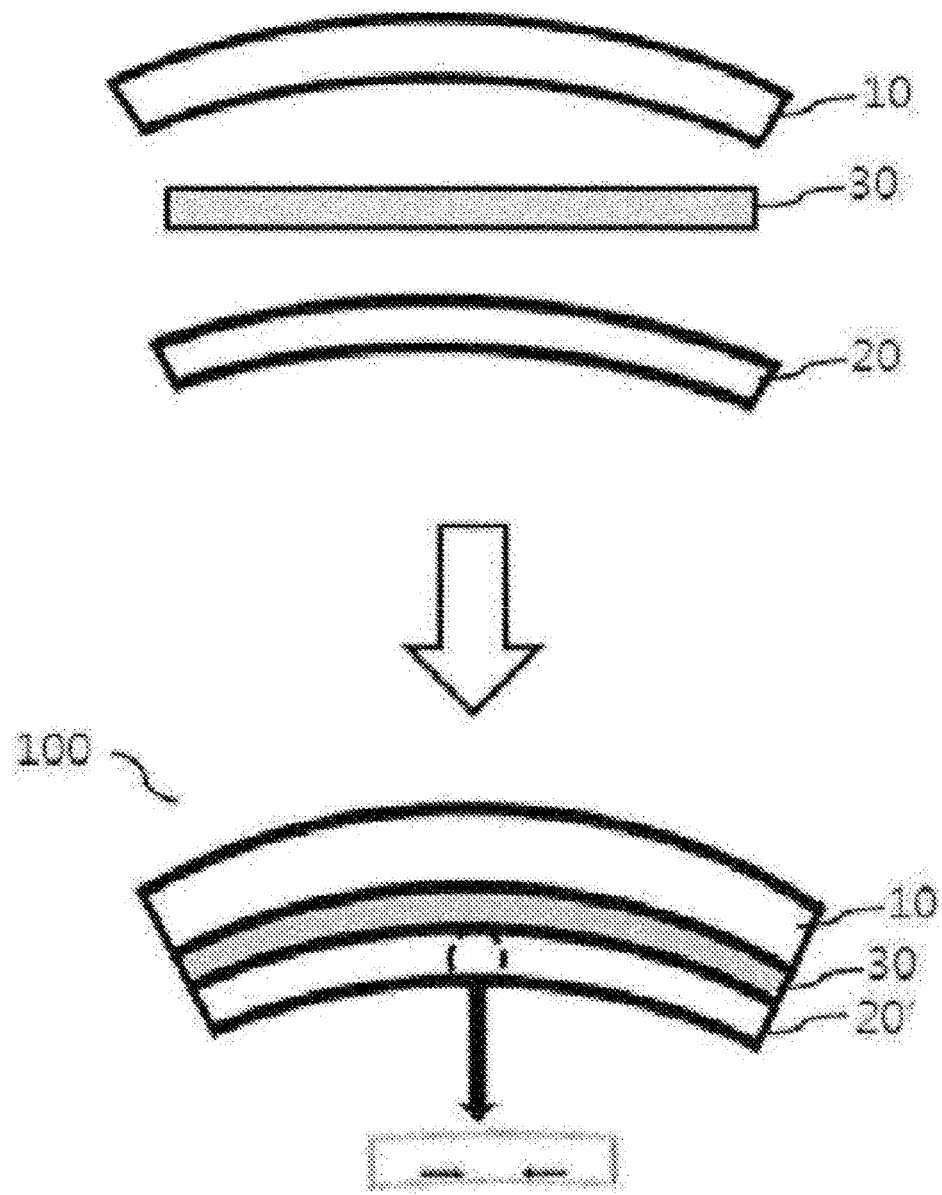
[FIG 1]

[FIG 2]
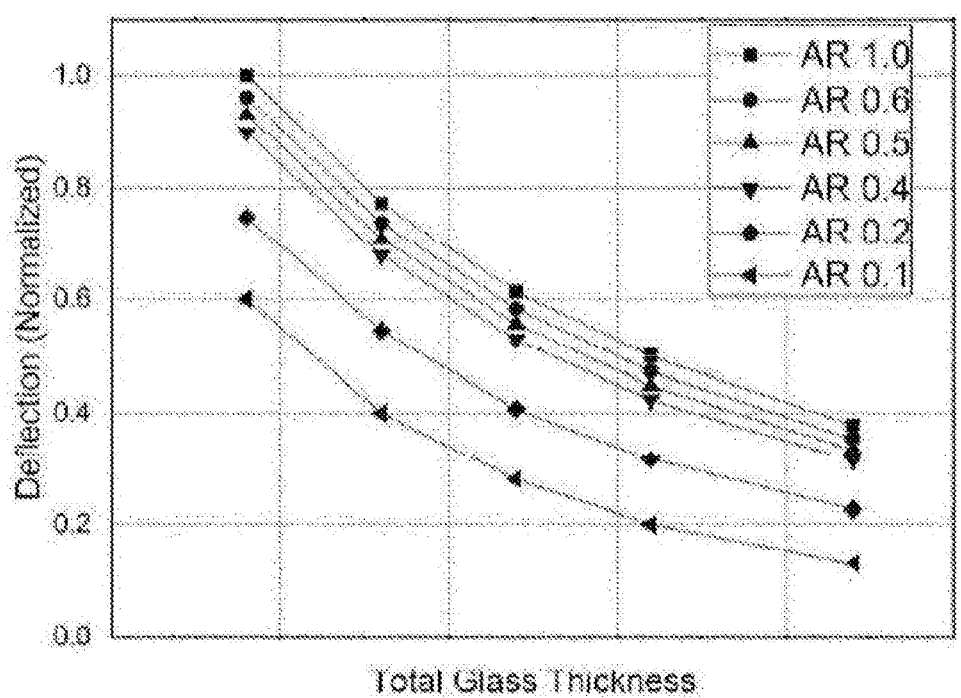

METHOD OF MANUFACTURING CURVED JOINED GLASS SHEET AND CURVED JOINED GLASS SHEET MANUFACTURED BY THE SAME

CROSS-REFERENCE TO RELATED APPLICATION(S)

This application is a National Stage Application of International Application No. PCT/KR2020/001014 filed on Jan. 21, 2020, which claims priority to and the benefit of Korean Patent Application No. 10-2018-0057867 filed on May 21, 2018, the disclosures of which are incorporated herein by reference in their entireties.

FIELD OF DISCLOSURE

The present disclosure relates to a method of manufacturing a curved joined glass sheet having excellent optical quality and a curved joined glass sheet manufactured by the same.

BACKGROUND ART

Glass is a material that has been applied to various living spaces because of its unique transparency. In particular, a joined glass sheet made by joining two glass sheets is used, and a curved joined glass sheet, which is curved to have a curved surface, is used depending on the intended use. In addition, the curved joined glass sheet is manufacturing by using a thick glass sheet and a thin glass sheet to reduce a volume and a weight of the curved joined glass sheet.

In general, self-weight molding, compression molding, or cold molding is used to manufacture the curved joined glass sheet. The self-weight molding uses a molding frame for fixing a rim of a glass sheet. Specifically, the self-weight molding is a method that increases a temperature of the glass sheet to be molded to a temperature in the vicinity of a softening point of glass, molds the glass by using the sagging of glass sheet by its own weight, and then joins the molded glass sheets. In addition, the compression molding is a method that molds a glass sheet to be molded by compressing the glass sheet with a frame having a predetermined shape in a state in which the glass sheet is sufficiently heated, and then joins the molded glass sheets. In addition, the cold molding is a method that one glass sheet is disposed on a concave surface of the other curvedly molded glass sheet, the one glass sheet is elastically deformed and curvedly molded by using a vacuum technology, and then the molded glass sheets are joined.

In the case in which the thin glass sheet is curvedly molded by using the cold molding, there is a problem in that the thin glass sheet buckles or wrinkles during the process of elastically deforming the thin glass sheet because a thickness of the thin glass sheet is smaller than an area of the thin glass sheet. In particular, the smaller the ratio of the thickness to the width of the thin glass sheet, the more often the curvedly molded thin glass sheet buckles or wrinkles. In addition, in the case in which the thin glass sheet is curvedly molded by using the cold molding, there may occur a problem in that stress remains in the curvedly molded thin glass sheet, such that the curved joined glass sheet is damaged at a predetermined temperature or higher.

In addition, there is a need for a technology for manufacturing a curved joined glass sheet having excellent optical quality by improving a degree of close contact between curved surfaces of a curved thin glass sheet and a curved thick glass sheet that constitute a curved joined glass sheet.

Therefore, there is a need for a technology for manufacturing a curved joined glass sheet having excellent optical quality while solving a problem that occurs when a thin glass sheet is molded by cold molding.

DISCLOSURE

Technical Problem

The present invention has been made in an effort to provide a method capable of easily manufacturing a curved joined glass sheet having excellent optical quality.

However, technical problems to be solved by the present invention are not limited to the above-mentioned technical problems, and other technical problems, which are not mentioned above, may be clearly understood by those skilled in the art from the following descriptions.

Technical Solution

An exemplary embodiment of the present invention provides a method of manufacturing a curved joined glass sheet, the method including: preparing a curved thick glass sheet having a first radius of curvature; manufacturing a curved thin glass sheet having a second radius of curvature by heating and molding a flat plate thin glass sheet; providing a joining film or an adhesive agent between a concave surface of the curved thick glass sheet and a convex surface of the curved thin glass sheet; and elastically deforming the curved thin glass sheet to join the elastically deformed curved thin glass sheet so as to match with the concave surface of the curved thick glass sheet, in which the first radius of curvature and the second radius of curvature satisfy the following Expression 1.

$$1 < (\text{Second Radius of Curvature}/\text{First Radius of Curvature}) \leq 5 \quad [\text{Expression 1}]$$

In addition, another exemplary embodiment of the present invention provides a curved joined glass sheet manufactured by the method of manufacturing a curved joined glass sheet.

Advantageous Effects

The method of manufacturing a curved joined glass sheet according to the exemplary embodiment of the present invention may easily manufacture the curved joined glass sheet having excellent optical quality.

The curved joined glass sheet according to the exemplary embodiment of the present invention may have excellent optical quality.

According to the exemplary embodiment of the present invention, it is possible to provide the curved joined glass sheet which has a small radius of curvature and is light in weight and small in thickness.

The effects of the present invention are not limited to the above-mentioned effects, and other effects, which are not mentioned above, may be clearly understood by those skilled in the art from the present specification and the accompanying drawings.

DESCRIPTION OF DRAWINGS

FIG. 1 is a view schematically illustrating a method of manufacturing a curved joined glass sheet according to an exemplary embodiment of the present invention.

FIG. 2 is a view illustrating a result of ensuring rigidity in accordance with a thickness ratio between a curved thick glass sheet and a curved thin glass sheet according to the exemplary embodiment of the present invention.

BEST MODE

The method of manufacturing a curved joined glass sheet according to an exemplary embodiment of the present invention may easily manufacture the curved joined glass sheet having excellent optical quality. Specifically, if a radius of curvature of a curved thick glass sheet and a radius of curvature of a curved thin glass sheet satisfy the above-mentioned Expression 1, a curved joined glass sheet having an excellent degree of close contact between curved surfaces may be manufactured.

FIG. 1 is a view schematically illustrating a method of manufacturing a curved joined glass sheet according to an exemplary embodiment of the present invention. Specifically, FIG. 1 is a view schematically illustrating a process of manufacturing a curved joined glass sheet 100 by positioning a joining film 30 between a convex surface of a heated and molded curved thin glass sheet 20 and a concave surface of a curved thick glass sheet 10 and elastically deforming the curved thin glass sheet 20 so that the curved joined glass sheet 100 includes an elastically deformed curved thin glass sheet 20', the joining film 30, and the curved thick glass sheet 10.

According to the exemplary embodiment of the present invention, the preparing of the curved thick glass sheet may manufacture the curved thick glass sheet having a first radius of curvature by using a publicly known method of molding a curved glass sheet in the art. As an example, the curved thick glass sheet having the first radius of curvature may be manufactured from a flat plate thick glass sheet by using self-weight molding or compression molding.

According to the exemplary embodiment of the present invention, soda lime glass may be used for the thick glass sheet. Specifically, a glass sheet, which is typically used for a glass window for a vehicle, may be adopted to and used for the thick glass sheet without a particular limitation. As an example, the thick glass sheet may be made of soda lime glass that is formed from a composition containing $SiO_2$ of 65 wt. % or more and 75 wt. % or less, $Al_2O_3$ of 0 wt. % or more and 10 wt. % or less, $Na_2O$ of 10 wt. % or more and 15 wt. % or less, $K_2O$ of 0 wt. % or more and 5 wt. % or less, CaO of 1 wt. % or more and 12 wt. % or less, and MgO of 0 wt. % or more and 8 wt. % or less, based on the composition of 100 wt. %. In addition, soda lime glass manufactured by a floating method using a float bath or soda lime glass manufactured by a down drawing method or a fusion method may be used for the thick glass sheet.

According to the exemplary embodiment of the present invention, a glass sheet, which is typically used for a glass window for a vehicle, may be adopted to and used for, without a particular limitation, the flat plate thin glass sheet thinner than the thick glass sheet. Specifically, the flat plate thin glass sheet may be made of alkali-free glass. As an example, the thin glass sheet may be made of alkali-free glass that is formed from a composition containing $SiO_2$ of 46 wt. % or more and 62 wt. % or less, $Al_2O_3$ of 15 wt. % or more and 29 wt. % or less, MgO of 3 wt. % or more and 14 wt. % or less, CaO of 5 wt. % or more and 16 wt. % or less, and SrO of 0.01 wt. % or more and 5 wt. % or less, based on the composition of 100 wt. %, and containing substantially no alkaline metal oxide.

In the present specification, containing substantially no alkaline metal oxide may mean that the alkaline metal oxide is not contained in the glass at all, or even if the alkaline metal oxide is partially contained in the glass, the content of the alkaline metal oxide is extremely small as compared with contents of the other components, such that the content of the alkaline metal oxide as a component of glass is negligible. In addition, containing substantially no alkaline metal oxide may mean that a small amount of alkaline metal elements is inevitably contained in the glass from refractory materials in contact with molten glass or from impurities in a glass raw material in a process of manufacturing glass.

According to the exemplary embodiment of the present invention, the alkali-free glass, which may be used for the thin glass sheet, may contain alkaline metal (Li, Na, K, etc.) oxide of less than 1% as a percentage by mass in terms of oxide. In addition, alkali-free borosilicate glass or alkali-free alumino-borosilicate glass may be used for the thin glass sheet. In addition, glass manufactured by a floating method or glass manufactured by a down drawing or fusion method may be used for the thin glass sheet.

According to the exemplary embodiment of the present invention, the manufacturing of the curved thin glass sheet may manufacture the curved thin glass sheet having a second radius of curvature from the flat plate thin glass sheet by using a publicly known method of heating and molding a curved glass sheet in the art. As an example, the curved thin glass sheet having the second radius of curvature larger than the first radius of curvature of the curved thick glass sheet may be manufactured by using self-weight molding or compression molding. In this case, since the curved thin glass sheet is manufactured by using the heating and molding method, it is possible to minimize stress occurring in the manufactured curved thin glass sheet, and it is possible to more easily manufacture the curved joined glass sheet. Specifically, as the stress present on the heated and molded curved thin glass sheet is minimized, the curved thin glass sheet may be more easily and elastically deformed and joined to the concave surface of the curved thick glass sheet.

According to the exemplary embodiment of the present invention, each of the curved thick glass sheet and the curved thin glass sheet may have a single curved surface or multiple curved surfaces. Specifically, each of the curved thick glass sheet and the heated and molded curved thin glass sheet may be a curved glass sheet which is formed based on a single axis and has a single curved surface having a curvature only in a single direction. In addition, each of the curved thick glass sheet and the heated and molded curved thin glass sheet may be a curved glass sheet which is formed based on two axes and has multiple curved surfaces having curvatures in multiple directions. As an example, the glass sheet may have the multiple curved surfaces which are parabolic surfaces, spherical surfaces, or freely-curved surfaces.

When the flat plate thin glass sheet is elastically deformed by the method in the related art to mold the curved glass sheet having the multiple curved surfaces, there is a problem in that a degree to which the molded curved glass sheet buckles and/or wrinkles become severe. However, the method of manufacturing a curved joined glass sheet according to the exemplary embodiment of the present invention may mold a glass sheet having multiple curved surfaces by primarily heating and molding a flat plate thin glass sheet, and may secondarily and elastically deform the glass sheet. Therefore, it is possible to effectively prevent the elastically deformed thin glass sheet having the multiple curved surfaces from buckling and/or wrinkling. Furthermore, if the relationship between the radius of curvature of the thick glass sheet having the multiple curved surfaces and the radius of curvature of the thin glass sheet having the multiple curved surfaces satisfies Expression 1 as described below, it is possible to manufacture a joined glass sheet having multiple curved surfaces and further improved optical quality.

Therefore, the method of manufacturing a curved joined glass sheet may easily manufacture a curved joined glass sheet having a single curved surface or multiple curved surfaces.

According to the exemplary embodiment of the present invention, a joining film or a bonding agent may be provided between the concave surface of the curved thick glass sheet and the convex surface of the curved thin glass sheet. Specifically, the joining film or the bonding agent may be provided on the convex surface of the heated and molded curved thin glass sheet, or the joining film or the bonding agent may be provided on the concave surface of the curved thick glass sheet. Therefore, the convex surface of the curved thin glass sheet may be joined to the concave surface of the curved thick glass sheet during the process of elastically deforming the heated and molded curved thin glass sheet.

According to the exemplary embodiment of the present invention, the joining film may have a single layer or multiple layers. Specifically, in a case in which a multilayer joining film is used, compositions of the respective layers may be identical or different, and thicknesses of the respective layers may be identical or different. A (co)polymer film, such as a polyvinyl alcohol film and a polyvinyl butyral copolymer film, which is used to join a joined glass sheet in the art, may be adopted to and used for the joining film without a particular limitation. As an example, the joining film may include at least one of polyethylene, ethylene-vinyl acetate copolymer, polypropylene, polystyrene, methacrylic resin, polyvinyl chloride, polyethylene terephthalate, polybutylene terephthalate, cellulose acetate, diallyl phthalate resin, urea resin, melamine resin, unsaturated polyester, polyvinyl butyral, polyvinyl formal, polyvinyl alcohol, vinyl acetate resin, ionomer, polymethyl pentene, vinylidene chloride, polysulphone, polyvinylidene fluoride, methacrylic-styrene co-polymer resin, polyarylate, polyallyl sulphone, polybutadiene, polyether sulphone, and polyether ether ketone.

According to the exemplary embodiment of the present invention, a thickness of the joining film may be, but not limited to, 0.5 mm or more and 1 mm or less. However, by adjusting the thickness of the joining film to the above-mentioned range, it is possible to prevent the curved thick glass sheet from being separated from the elastically deformed curved thin glass sheet. In addition, by adjusting the thickness of the joining film to the above-mentioned range, it is possible to manufacture the curved joined glass sheet which is small in thickness.

According to the exemplary embodiment of the present invention, the bonding agent may include optically clear adhesive (OCA), liquid optically clear adhesive (LOCA), or optically clear resin (OCR). The bonding agent may be applied, with a thickness of 0.5 mm or more and 1.5 mm or less, onto the concave surface of the curved thick glass sheet or the convex surface of the heated and molded curved thin glass sheet.

According to the exemplary embodiment of the present invention, it is possible to primarily manufacture the curved thin glass sheet having the second radius of curvature larger than the first radius of curvature by heating and molding the flat plate thin glass sheet. Further, it is possible to secondarily manufacture the curved thin glass sheet having the radius of curvature equal to the radius of curvature of the curved thick glass sheet by elastically deforming the heated and molded curved thin glass sheet. Therefore, it is possible to easily manufacture the curved joined glass sheet having excellent optical quality and an improved degree of close contact between the glass sheets.

According to the exemplary embodiment of the present invention, a method, which is typically used in the art, may be used, without a particular limitation, as the method of elastically deforming the heated and molded curved thin glass sheet. As an example, the heated and molded curved thin glass sheet may be elastically deformed at a temperature condition of about 20° C. or more and 80° C. or less by a compression process using a high-temperature roller or vacuum ring/vacuum bag process.

According to the exemplary embodiment of the present invention, a second radius of curvature R2 of the heated and molded curved thin glass sheet Specifically, the value of R2/R1 may be 1.1 or more and 1.4 or less, 1.1 or more and 1.5 or less, 1.1 or more and 2 or less, 1.1 or more and 2.1 or less, 1.1 or more and 3 or less, 1.4 or more and 1.5 or less, 1.4 or more and 2 or less, 1.4 or more and 2.1 or less, 1.4 or more and 3 or less, 1.5 or more and 2 or less, 1.5 or more and 2.1 or less, 1.5 or more and 3 or less, 2 or more and 2.1 or less, 2 or more and 3 or less, 2.1 or more and 3 or less, 1.1 or more and 4.5 or less, 1.3 or more and 4 or less, or 2 or more and 3.5 or less. By adjusting the value of R2/R1 to the above-mentioned range, it is possible to manufacture the curved joined glass sheet having excellent optical quality, and it is possible to improve efficiency in joining the curved thick glass sheet and the heated and molded curved thin glass sheet. Specifically, in the case in which the value of R2/R1 is within the above-mentioned range, it is possible to effectively inhibit the elastically deformed curved thin glass sheet from buckling or wrinkling. In addition, it is possible to reduce residual stress occurring in the elastically deformed curved thin glass sheet by heating and molding the flat plate thin glass sheet so that the value of R2/R1 satisfies the above-mentioned range.

According to the exemplary embodiment of the present invention, the first radius of curvature of the curved thick glass sheet and the second radius of curvature of the curved thin glass sheet may satisfy the following Expression 2.

$$100 \text{ mm} \leq (\text{Second Radius of Curvature} - \text{First Radius of Curvature}) \leq 6{,}000 \text{ mm} \quad [\text{Expression 2}]$$

Specifically, a value of "R2−R1" made by subtracting the first radius of curvature R1 of the curved thick glass sheet from the second radius of curvature R2 of the heated and molded curved thin glass sheet may be 100 mm or more and 4,000 mm or less, 500 mm or more and 4,000 mm or less, 600 mm or more and 4,000 mm or less, 1,600 mm or more and 4,000 mm or less, 2,000 nm or more and 4,000 nm or less, 100 mm or more and 2,000 mm or less, 500 mm or more and 2,000 mm or less, 600 mm or more and 2,000 mm or less, 1,600 mm or more and 2,000 mm or less, 100 mm or more and 1,600 mm or less, 500 mm or more and 1,600 mm or less, 600 mm or more and 1,600 mm or less, 100 mm or more and 600 mm or less, 500 mm or more and 600 mm or less, 100 mm or more and 500 mm or less, 200 mm or more and 5,500 mm or less, 350 mm or more and 4,700 mm or less, 750 mm or more and 3,000 mm or less, 100 mm or more and 1,000 mm or less, 1,200 mm or more and 2,500 mm or less, 3,000 mm or more and 4,500 mm or less, or 5,000 mm or more and 5,500 mm or less.

According to the exemplary embodiment of the present invention, by adjusting the value of R2–R1 to the above-mentioned range, it is possible to manufacture the curved joined glass sheet having excellent optical quality, and it is possible to more easily and elastically deform the heated and molded curved thin glass sheet. Specifically, by adjusting the value of R2–R1 to the above-mentioned range, it is possible to prevent damage to the heated and molded curved thin glass sheet during the process of elastically deforming the heated and molded curved thin glass sheet, and it is possible to join the convex surface of the elastically deformed curved thin glass sheet more closely to the concave surface of the curved thick glass sheet.

According to the exemplary embodiment of the present invention, the heated and molded curved thin glass sheet may be elastically deformed to be matched with and joined to the concave surface of the curved thick glass sheet. Therefore, the heated and molded curved thin glass sheet may be elastically deformed to have the radius of curvature substantially equal to the radius of curvature of the curved thick glass sheet. The configuration in which the glass sheets have substantially the same radius of curvature may mean that the curvatures of the glass sheets are completely equal to each other, and may also mean that there is a delicate difference between the curvatures of the glass sheets during the manufacturing process, but the difference does not affect quality and optical and physical properties.

According to the exemplary embodiment of the present invention, the curved thin glass sheet may be elastically deformed to have the radius of curvature of 500 mm or more and 8,000 mm or less. Specifically, the radius of curvature of the elastically deformed curved thin glass sheet may be 1,500 mm or more and 2,000 mm or less, 1,500 mm or more and 3,000 mm or less, 1,500 mm or more and 8,000 mm or less, 2,000 mm or more and 3,000 mm or less, 2,000 mm or more and 8,000 mm or less, 3,000 mm or more and 8,000 mm or less, 700 mm or more and 7,000 mm or less, 1,000 mm or more and 5,500 mm or less, 1,200 mm or more and 4,500 mm or less, 750 mm or more and 1,500 mm or less, 1,700 mm or more and 3,500 mm or less, or 4,000 mm or more and 7,500 mm or less. A minimum radius of curvature of a curved thin glass sheet molded by cold molding in the related art is at a level of approximately 2,000 mm, and there is a problem in that fine cracks or wrinkles are formed in the surface of the manufactured curved thin glass sheet when the flat plate thin glass sheet is molded by cold molding so that the radius of curvature is at a level of 2,000 mm. However, in comparison with the cold molding method in the related art, the method of manufacturing a curved joined glass sheet according to the exemplary embodiment of the present invention may easily manufacture the curved joined glass sheet including the curved thin glass sheet having the small radius of curvature, and may inhibit a deterioration in optical quality of the manufactured curved joined glass sheet.

In addition, the thin glass sheet, which has the multiple curved surfaces and the radius of curvature of 500 mm or more and 8,000 mm or less, may be formed as the heated and molded thin glass sheet having the multiple curved surfaces is elastically deformed from the flat plate thin glass sheet. The radius of curvature of the thin glass sheet having the multiple curved surfaces may be a minimum value of the radii of curvature measured at multiple points spaced apart at an equal distance from a center of the thin glass sheet having the multiple curved surfaces.

According to the exemplary embodiment of the present invention, the method of manufacturing a curved joined glass sheet may further include heat-treating the curved joined glass sheet, which is made by joining the curved thick glass sheet and the elastically deformed curved thin glass sheet, at a temperature of 80° C. or more and 140° C. or less. Specifically, the curved joined glass sheet made after the heated and molded curved thin glass sheet is elastically deformed and joined to the curved thick glass sheet may be heat-treated within the above-mentioned temperature range. Since the curved joined glass sheet is heat-treated within the above-mentioned temperature range, it is possible to improve joining force between the curved thin glass sheet and the curved thick glass sheet, and it is possible to prevent the joining film or the bonding agent from being degenerated.

In addition, the method of manufacturing a curved joined glass sheet may include heat-treating the curved joined glass sheet twice or more. As an example, the method of manufacturing a curved joined glass sheet may finally manufacture the curved joined glass sheet by heat-treating the curved joined glass sheet at a temperature of about 90° C. and then heat-treating the curved joined glass sheet again at a temperature of about 120° C.

According to the exemplary embodiment of the present invention, a thickness ratio between the curved thick glass sheet and the curved thin glass sheet may be 1:0.1 to 1:0.5. Specifically, the thickness ratio between the curved thick glass sheet and the curved thin glass sheet may be 1:0.15 to 1:0.45, 1:0.25 to 1:0.3, 1:0.15 to 1:0.25, or 1:0.3 to 1:0.45. By adjusting the thickness ratio between the curved thick glass sheet and the curved thin glass sheet to the above-mentioned range, it is possible to effectively reduce a probability that the curved joined glass sheet including the curved thick glass sheet and the curved thin glass sheet is damaged due to a decrease in rigidity. In addition, it is possible to provide a curved joined glass sheet having a smaller thickness.

FIG. 2 is a view illustrating a result of ensuring rigidity in accordance with the thickness ratio between the curved thick glass sheet and the curved thin glass sheet according to the exemplary embodiment of the present invention. Specifically, FIG. 2 is a view illustrating deflection of a central portion analyzed by applying a predetermined load to the central portion in a state in which four edges of the curved joined glass sheet according to the exemplary embodiment of the present invention are fixed. In FIG. 2, the x axis indicates an overall thickness of the glass sheet, and the y axis indicates the deflection of the glass sheet, that is, a degree to which the glass sheet sags.

According to the exemplary embodiment of the present invention, an asymmetry ratio (AR), which is [a thickness of the curved thin glass sheet]/[a thickness of the curved thick glass sheet], may satisfy a range from 0.1 to 0.5. A decrease in AR means that the curved thin glass sheet becomes thinner and the curved thick glass sheet becomes thicker. Referring to FIG. 2, by adjusting the thickness ratio between the curved thin glass sheet and the curved thick glass sheet to the above-mentioned range, it is possible to ensure rigidity by decreasing a degree to which the curved joined glass sheet sags.

Therefore, according to the exemplary embodiment of the present invention, by adjusting the thickness ratio between the curved thin glass sheet and the curved thick glass sheet to the above-mentioned range, it is possible to further improve an effect of improving rigidity of the curved joined glass sheet, an effect of reducing a weight of the curved joined glass sheet, and an effect of reducing a thickness of the curved joined glass sheet.

According to the exemplary embodiment of the present invention, the thickness of the flat plate thin glass sheet may be 0.3 mm or more and 1.0 mm or less, specifically, 0.3 mm or more and 0.8 mm or less, 0.4 mm or more and 0.6 mm or less, 0.3 mm or more and 0.7 mm or less, or 0.5 mm or more and 0.8 mm or less. The curved joined glass sheet including the curved thin glass sheet having the thickness within the above-mentioned range may have excellent impact resistance and may be effectively small in thickness and light in weight. In addition, the heated and molded curved thin glass sheet having the thickness within the above-mentioned range may be easily and elastically deformed.

According to the exemplary embodiment of the present invention, by adjusting the radius of curvature of the curved thick glass sheet and the radius of curvature of the heated and molded curved thin glass sheet as described above, it is possible to manufacture the curved joined glass sheet which has excellent optical and physical properties and includes the curved thin glass sheet which is inhibited from buckling or wrinkling even though the flat plate thin glass sheet having the thickness of 0.3 mm or more and 1.0 mm or less is used.

According to the exemplary embodiment of the present invention, the thickness of the curved thick glass sheet may be 2 mm or more and 3 mm or less. Specifically, the thickness of the curved thick glass sheet may be 2.5 mm or more and 3 mm or less. By adjusting the thickness of the curved thick glass sheet to the above-mentioned range, it is possible to effectively reduce the weight and the thickness of the curved joined glass sheet and to inhibit a deterioration in impact resistance of the curved joined glass sheet.

Another exemplary embodiment of the present invention provides a curved joined glass sheet manufactured by the method of manufacturing a curved joined glass sheet.

According to the exemplary embodiment of the present invention, it is possible to provide the curved joined glass sheet which has a small radius of curvature and is light in weight and small in thickness. In addition, since the curved joined glass sheet includes the curved thin glass sheet which is inhibited from buckling or wrinkling, the curved joined glass sheet may have excellent optical quality.

According to the exemplary embodiment of the present invention, the curved thick glass sheet, the curved thin glass sheet, the joining film, and the bonding agent, which are included in the curved joined glass sheet, may be identical to the curved thick glass sheet, the curved thin glass sheet, the joining film, and the bonding agent according to the method of manufacturing a curved joined glass sheet, respectively.

According to the exemplary embodiment of the present invention, the radius of curvature of the curved joined glass sheet may be 500 mm or more and 8,000 mm or less. That is, the radii of curvature of the curved thin glass sheet and the curved thick glass sheet, which are included in the curved joined glass sheet, may be substantially equal to each other, and the radius of curvature may be 500 mm or more and 8,000 mm or less. In addition, the radius of curvature of the curved joined glass sheet may be 700 mm or more and 7,000 mm or less, 1,000 mm or more and 5,500 mm or less, 1,200 mm or more and 4,500 mm or less, 1,500 mm or more and 3,000 mm or less, 750 mm or more and 1,500 mm or less, 1,700 mm or more and 3,500 mm or less, or 4,000 mm or more and 7,500 mm or less. In addition, the curved joined glass sheet may have the multiple curved surfaces, and the radius of curvature of the joined glass sheet having the multiple curved surfaces may be 500 mm or more and 8,000 mm or less. The radius of curvature of the joined glass sheet having the multiple curved surfaces may be a minimum value of the radii of curvature measured at multiple points spaced apart at an equal distance from a center of the joined glass sheet having the multiple curved surfaces.

In addition, referring to FIG. 1, the curved thin glass sheet 20' is an elastically deformed glass sheet, and compressive stress may be formed in one concave surface of the curved thin glass sheet 20', such that the curved joined glass sheet 100 may be excellent in mechanical and physical properties such as impact resistance and durability.

According to the exemplary embodiment of the present invention, residual stress of the curved thin glass sheet included in the curved joined glass sheet may be 350 MPa or less. Specifically, the residual stress of the curved thin glass sheet may be 20 MPa or more and 300 MPa or less, 20 MPa or more and 200 MPa or less, or 20 MPa or more and 100 MPa or less. The curved joined glass sheet including the curved thin glass sheet, of which the residual stress satisfies the above-mentioned range after the elastic deformation, may be excellent in durability against heat and impact resistance.

According to the exemplary embodiment of the present invention, the term "stress" may mean stress including tensile stress and compressive stress. In addition, in the present invention, the stress present on the glass sheet may be calculated by a general method used in the art, and the stress may be calculated through an optical method using the Edge-master equipment (Stress Photonics, Inc.). Specifically, by using the Edge-master equipment, it is possible to acquire an image which shows colors distinguished in accordance with the stress present on the surface of the glass sheet, and it is possible to calculate a value of stress present on the glass sheet by using the image. In addition, it is possible to calculate stress present on the surface of the glass sheet by using the Solidworks Simulation. For example, manufacturing processes and process conditions for the curved joined glass sheet according to the present invention may be set in the Solidworks Simulation, and then it is possible to calculate stress occurring on the respective glass sheets during the process of elastically deforming the curved thin glass sheet and residual stress present on the respective glass sheets included in the finished curved joined glass sheet.

According to the exemplary embodiment of the present invention, the thickness ratio between the curved thick glass sheet and the curved thin glass sheet included in the curved joined glass sheet may be 1:0.1 to 1:0.5. In addition, the thickness of the curved thin glass sheet may be 0.3 mm or more and 1.0 mm or less, and the thickness of the curved thick glass sheet may be 2 mm or more and 3 mm or less. An upper limit value and a lower limit value of the thicknesses of the curved thin glass sheet and the curved thick glass sheet included in the curved joined glass sheet may be determined in consideration of external force applied to the curved joined glass sheet and an ability of elastically absorbing mechanical impact.

According to the exemplary embodiment of the present invention, the curved thin glass sheet and the curved joined glass sheet including the curved thin glass sheet, of which the thicknesses are within the above-mentioned ranges, may have a thickness of 50% or more and 80% or less and a weight of 50% or more and 80% or less in comparison with a curved joined glass sheet in the related art which is made by joining two soda lime glass sheets in the related art each having a thickness of about 2.1 mm. Therefore, according to the exemplary embodiment of the present invention, it is possible to easily implement the curved joined glass sheet which is lighter in weight and smaller in thickness than the curved joined glass sheet in the related art.

According to the exemplary embodiment of the present invention, a Vickers hardness ratio between the curved thick glass sheet and the curved thin glass sheet may be 1:1.1 to 1:1.3. Specifically, the Vickers hardness ratio between the curved thick glass sheet and the curved thin glass sheet may be 1:1.12 to 1:1.27, 1:1.15 to 1:1.25, or 1:1.2 to 1:1.23. The curved joined glass sheet including the curved thin glass sheet, which has higher hardness than the curved thick glass sheet, may be excellent in wear resistance, scratch resistance, and durability.

According to the exemplary embodiment of the present invention, the Vickers hardness of the curved thin glass sheet may be 5.5 GPa or more and 7 GPa or less. Specifically, the curved thin glass sheet may have the Vickers hardness of 5.8 GPa or more and 6.9 GPa or less, 6.0 GPa or more and 6.7 GPa or less, or 6.2 GPa or more and 6.5 GPa or less. The curved joined glass sheet including the curved thin glass sheet having the value of the Vickers hardness within the above-mentioned range may be excellent in impact resistance, wear resistance, and durability. In addition, it is possible to reduce manufacturing costs for the curved joined glass sheet. In addition, the curved thick glass sheet may have the Vickers hardness of 5.2 GPa or more and 5.8 GPa or less.

The Vickers hardness of the curved thin glass sheet and the Vickers hardness of the curved thick glass sheet may be calculated by pressing the glass sheet with a Vickers indenter and then measuring a size of a mark. Specifically, the Vickers hardness of the curved thin glass sheet and the Vickers hardness of the curved thick glass sheet may be measured based on ASTM C1327-08 standard under a condition in which a temperature is 24° C., relative humidity is 35 RH %, an indentation load is 200 gf, and an indentation maintenance time is 20 seconds.

According to the exemplary embodiment of the present invention, a fracture toughness ratio between the curved thick glass sheet and the curved thin glass sheet may be 1:1.3 to 1:1.5. Specifically, the fracture toughness ratio between the curved thick glass sheet and the curved thin glass sheet may be 1:1.35 to 1:1.49, 1:1.37 to 1:1.45, or 1:1.39 to 1:1.45. As the curved thin glass sheet has the fracture toughness within the above-mentioned range with respect to the curved thick glass sheet, it is possible to improve fracture resistance of the curved joined glass sheet against external impact and to effectively prevent a deterioration in fracture strength of the curved joined glass sheet.

According to the exemplary embodiment of the present invention, a value of the fracture toughness of the curved thin glass sheet may be 1.0 MPa·m½ or more and 1.3 MPa·m½ or less. Specifically, the value of the fracture toughness of the curved thin glass sheet may be 1.1 MPa·m½ or more and 1.25 MPa·m½ or less, 1.15 MPa·m½ or more and 1.25 MPa·m½ or less, or 1.18 MPa·m½ or more and 1.21 MPa·m½ or less. The curved joined glass sheet including the curved thin glass sheet having the value of the fracture toughness within the above-mentioned range may be excellent in impact resistance.

According to the exemplary embodiment of the present invention, the value of the fracture toughness of the curved thick glass sheet may be 0.7 MPa·m½ or more and 0.85 MPa·m½ or less. Specifically, the value of the fracture toughness of the curved thick glass sheet may be 0.75 MPa·m½ or more and 0.83 MPa·m½ or less, or 0.77 MPa·m½ or more and 0.8 MPa·m½ or less.

The values of the fracture toughness of the curved thin glass sheet and the curved thick glass sheet may be measured by using an indentation fracture toughness measuring method which is a method that presses the glass sheet with a Vickers indenter until a crack is formed in the glass sheet, and then measures the value of the fracture toughness by using a length of the crack, a mark formed by the indenter, a load, and the like. Specifically, the values of the fracture toughness of the curved thin glass sheet and the curved thick glass sheet may be measured based on KSL 1600:2010 standard under a condition in which a temperature is 24° C., relative humidity is 35 RH %, and an indentation load is 2 Kgf.

According to the exemplary embodiment of the present invention, an elastic modulus ratio between the curved thick glass sheet and the curved thin glass sheet may be 1:1.01 to 1:1.2. Specifically, the elastic modulus ratio between the curved thick glass sheet and the curved thin glass sheet may be 1:1.04 to 1:1.17, 1:1.06 to 1:1.15, 1:1.08 to 1:1.12, or 1:1.08 to 1:1.15. As the curved thin glass sheet has the elastic modulus within the above-mentioned range with respect to the curved thick glass sheet, the curved joined glass sheet may have a robust structure even though the curved joined glass sheet includes the curved thin glass sheet that is lighter in weight and smaller in thickness than the curved thick glass sheet.

According to the exemplary embodiment of the present invention, the elastic modulus of the curved thin glass sheet may be 70 GPa or more and 90 GPa or less. Specifically, the curved thin glass sheet may have the elastic modulus of 73 GPa or more and 87 GPa or less, 75 GPa or more and 85 GPa or less, 78 GPa or more and 80 GPa or less, 75 GPa or more and 80 GPa or less, or 80 GPa or more and 90 GPa or less. In addition, the curved thick glass sheet may have the elastic modulus of 65 GPa or more and 75 GPa or less.

The elastic modulus of the curved thin glass sheet and the elastic modulus of the curved thick glass sheet may be measured by a three-point bending test. Specifically, the elastic modulus of the curved thin glass sheet and the elastic modulus of the curved thick glass sheet may be measured through the three-point bending test using a universal testing machine (UTM) under a condition in which a temperature is 24° C. and relative humidity is 35 RH %. More specifically, it is possible to derive the elastic modulus based on a gradient calculated by setting a width of a sample to 20 mm, setting a support span to 50 mm, converting a displacement and a load measured by the UTM into strain and stress to derive a strain-stress (S-S) curve, and then linearly fitting the S-S curve.

MODE FOR INVENTION

Hereinafter, Examples will be described in detail to specifically describe the present invention. However, Examples according to the present invention may be modified in various different forms, and it is not interpreted that the scope of the present invention is limited to the following Examples. The Examples of the present specification are provided to further completely explain the present invention to those skilled in the art.

EXAMPLE 1

Alkali-free glass, included $SiO_2$ of 61 wt. %, $Al_2O_3$ of 16 wt. %, MgO of 3 wt. %, CaO of 8 wt. % or less, and SrO of 0.05 wt. %, based on glass of 100 wt. %, and had a thickness of 0.5 mm, was prepared as a thin glass sheet, and soda lime glass, included $SiO_2$ of 72 wt. %, $Al_2O_3$ of 0.15 wt. %, $Na_2O$ of 14 wt. %, $K_2O$ of 0.03 wt. %, CaO of 9 wt. %, and MgO of 4 wt. %, based on glass of 100 wt. %, and had a thickness of 2.0 mm, was prepared as a thick glass sheet. In addition, a polyvinyl butyral film having a thickness of 0.5 mm was prepared as a joining film. The alkali-free glass had an elastic modulus of 78 GPa, Vickers hardness of 6.3 GPa, fracture toughness of 1.20 MPa·m½, and the soda lime glass had an elastic modulus of 72 GPa, Vickers hardness of 5.6 GPa, and fracture toughness of 0.85 MPa·m½.

First, the thick glass sheet was heated at 600° C. for 60 seconds, and a curved thick glass sheet was manufactured by using its own weight. A radius of curvature R1 of the curvedly molded curved thick glass sheet was about 1,400 mm. In addition, the thin glass sheet was heated at 900° C. for 60 seconds, and a curved thin glass sheet having a radius of curvature R2 of about 3,000 mm was manufactured by using its own weight.

Thereafter, the joining film was positioned on a convex surface of the curved thin glass sheet, a concave surface of the curved thick glass sheet was positioned adjacent to the joining film, the curved thin glass sheet and the curved thick glass sheet were put into a vacuum bag, the vacuum bag was sealed, and then a vacuum atmosphere was formed in the vacuum bag. In this case, the interior of the vacuum bag was maintained for 30 minutes under a condition of about 80° C. and about −0.8 bar. Thereafter, the curved joined glass sheet, which was manufactured by joining the convex surface of the curved thin glass sheet and the concave surface of the curved thick glass sheet, was taken out of the vacuum bag, and the curved joined glass sheet was heat-treated under a condition of about 130° C. and 13 bar, such that the curved joined glass sheet was finally manufactured. A radius of curvature of the manufactured curved joined glass sheet was about 1,400 mm. In addition, maximum residual stress of the curved thin glass sheet included in the manufactured curved joined glass sheet was calculated by using the Solidworks Simulation.

EXAMPLES 2 TO 6

A curved joined glass sheet was manufactured with the same method as in Example 1 except that the thick glass sheet was molded as the curved thick glass sheet having the radius of curvature R1 as shown in Table 1 and the thin glass sheet was molded as the curved thin glass sheet having the radius of curvature R2 as shown in Table 1. The radius of curvature of the manufactured curved joined glass sheet was almost the same as the radius of curvature of the curved thick glass sheet.

COMPARATIVE EXAMPLES 1 TO 3

A thick glass sheet was molded as a curved thick glass sheet having a radius of curvature R1 as shown in Table 1, a joining film and the curved thick glass sheet were positioned on a flat plate thin glass sheet, and then the flat plate thin glass sheet was elastically deformed with the same method as in Example 1.

COMPARATIVE EXAMPLES 4 TO 7

A curved thin glass sheet was elastically deformed with the same method as in Example 1 except that the thick glass sheet was molded as the curved thick glass sheet having the radius of curvature R1 as shown in Table 1 and the thin glass sheet was molded as the curved thin glass sheet having the radius of curvature R2 as shown in Table 1.

Manufacturing results in Examples 1 to 6 of the present invention and Comparative Examples 1 to 7 are shown in Table 1.

TABLE 1

| | R1 (mm) | R2 (mm) | R2 − R1 (mm) | R2/R1 | Join-ability | Residual Stress (MPa) |
|---|---|---|---|---|---|---|
| Example 1 | 1,400 | 3,000 | 1,600 | 2.1 | ○ | 138 |
| Example 2 | 1,400 | 2,000 | 600 | 1.4 | ○ | 90 |
| Example 3 | 1,400 | 1,500 | 100 | 1.1 | ○ | 28 |
| Example 4 | 4,000 | 8,000 | 4,000 | 2 | ○ | 31 |
| Example 5 | 1,000 | 3,000 | 2,000 | 3.0 | ○ | 313 |
| Example 6 | 1,000 | 1,500 | 500 | 1.5 | ○ | 197 |
| Comparative Example 1 | 1,000 | Flat Plate | — | — | X | — |
| Comparative Example 2 | 1,400 | Flat Plate | — | — | X | — |
| Comparative Example 3 | 4,000 | Flat Plate | — | — | ○ | — |
| Comparative Example 4 | 1,400 | 1,100 | −300 | 0.8 | X | — |
| Comparative Example 5 | 4,000 | 1,000 | −3,000 | 0.3 | X | — |
| Comparative Example 6 | 1,000 | 8,000 | 7,000 | 6.0 | X | — |
| Comparative Example 7 | 1,000 | 800 | −200 | 0.8 | X | — |

Referring to Table 1, it was ascertained that in the case of Examples 1 to 6 in which the radius of curvature R1 of the curved thick glass sheet and the radius of curvature R2 of the heated and molded curved thin glass sheet satisfied Expression 1, the curved thin glass sheet was not damaged and the surface of the curved thin glass sheet did not buckle nor wrinkle during the process of elastically deforming the curved thin glass sheet. In addition, it was ascertained that a degree of close contact between the surfaces of the curved thin glass sheet and the curved thick glass sheet included in each of the curved joined glass sheets manufactured in Examples 1 to 6 was constant, such that the manufactured curved joined glass sheets were excellent in optical quality. In addition, it was ascertained that the curved joined glass sheets manufactured according to Examples 1 to 6 of the present invention each had a small radius of curvature and were excellent in optical quality. In addition, referring to Examples 1 to 3 of the present invention, it was ascertained that the residual stress of the curved thin glass sheet included in the curved joined glass sheet might be controlled by adjusting the value of "R2−R1" and the value of "R2/R1". In contrast, in the case of Comparative Examples 1 and 2 in which the flat plate thin glass sheet was elastically deformed in the same manner as in the cold molding method in the related art, the curved joined glass sheet could not be manufactured because the flat plate thin glass sheet was damaged during the process of elastically deforming the flat plate thin glass sheet. In addition, in the case of Comparative Example 3 in which the radius of curvature R1 of the curved thick glass sheet was about 4,000, the curved joined glass sheet could be manufactured by elastically deforming the flat plate thin glass sheet, but it was ascertained that the surface of the curved thin glass sheet buckled or wrinkled. In addition, in the case of Comparative Examples 4 to 7 in which the radius of curvature R1 of the curved thick glass sheet and the radius of curvature R2 of the heated and molded curved thin glass sheet did not satisfy Expression 1, it was ascertained that the heated and molded curved thin glass sheet was damaged during the process of elastically deforming the heated and molded curved thin glass sheet.

Therefore, according to the exemplary embodiment of the present invention, it can be seen that the radius of curvature R1 of the curved thick glass sheet and the radius of curvature R2 of the heated and molded curved thin glass sheet are adjusted to satisfy Expression 1, such that the curved joined glass sheet having excellent optical quality may be manufactured.

DESCRIPTION OF MAIN REFERENCE NUMERALS OF DRAWINGS

10: Curved thick glass sheet
20, 20': Curved thin glass sheet
30: Joining film
100: Curved joined glass sheet

The invention claimed is:

1. A method of manufacturing a curved joined glass sheet, the method comprising:
   preparing a curved thick glass sheet having a first radius of curvature;
   manufacturing a curved thin glass sheet having a second radius of curvature by heating and molding a flat plate thin glass sheet;
   providing a joining film or an adhesive agent between a concave surface of the curved thick glass sheet and a convex surface of the curved thin glass sheet; and
   elastically deforming the curved thin glass sheet to join the elastically deformed curved thin glass sheet so as to match with the concave surface of the curved thick glass sheet,
   wherein a thickness of the flat plate thin glass sheet is 0.3 mm or more and 1.0 mm or less, and
   wherein the first radius of curvature and the second radius of curvature satisfy the following Expression 1:

$$1 < (\text{Second Radius of Curvature}/\text{First Radius of Curvature}) \leq 5. \quad \text{[Expression 1]}$$

2. The method of claim 1, wherein the first radius of curvature and the second radius of curvature satisfy the following Expression 2:

$$100 \text{ mm} \leq (\text{Second Radius of Curvature} - \text{First Radius of Curvature}) \leq 6{,}000 \text{ mm}. \quad \text{[Expression 2]}$$

3. The method of claim 1, further comprising:
   heat-treating the curved joined glass sheet, which is made by joining the curved thick glass sheet and the curved thin glass sheet, at a temperature of 80° C. or more and 140° C. or less.

4. The method of claim 1, wherein the curved thin glass sheet is elastically deformed to have a radius of curvature of 500 mm or more and 8,000 mm or less.

5. The method of claim 1, wherein a thickness ratio between the curved thick glass sheet and the curved thin glass sheet is 1:0.1 to 1:0.5.

6. The method of claim 1, wherein each of the curved thick glass sheet and the curved thin glass sheet has a single curvature surface or multiple curvature surfaces.

7. A curved joined glass sheet manufactured by the method according to claim 1.

8. The curved joined glass sheet of claim 7, wherein a radius of curvature of the curved joined glass sheet is 500 mm or more and 8,000 mm or less.

9. The curved joined glass sheet of claim 7, wherein residual stress of the curved thin glass sheet included in the curved joined glass sheet is 350 MPa or less.

* * * * *